(12) United States Patent
Walton et al.

(10) Patent No.: US 10,878,970 B2
(45) Date of Patent: Dec. 29, 2020

(54) NUCLEAR REACTOR REFUELING METHODS AND APPARATUSES

(71) Applicant: BWXT mPower, Inc., Charlotte, NC (US)

(72) Inventors: Lewis A. Walton, Forest, VA (US); Matthew W. Ales, Puyallup, WA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 16/692,177

(22) Filed: Nov. 22, 2019

(65) Prior Publication Data
US 2020/0105427 A1 Apr. 2, 2020

Related U.S. Application Data

(60) Division of application No. 15/970,316, filed on May 3, 2018, now Pat. No. 10,490,311, which is a (Continued)

(51) Int. Cl.
G21C 19/10 (2006.01)
G21C 19/20 (2006.01)

(52) U.S. Cl.
CPC ........... G21C 19/10 (2013.01); G21C 19/205 (2013.01)

(58) Field of Classification Search
CPC .............................. G21C 19/10; G21C 19/205
See application file for complete search history.

(56) References Cited

U.S. PATENT DOCUMENTS 3,356,578 A * 12/1967 Dryland ................... G21C 7/14
376/362
3,768,668 A 10/1973 Schukei
(Continued)

FOREIGN PATENT DOCUMENTS

CN 1261715 A 8/2000
FR 2905030 A1 * 2/2008 ............. G21C 19/10
(Continued)

OTHER PUBLICATIONS

European Search Report dated Mar. 9, 2015 for EP Application No. 12825470.3.
(Continued)

*Primary Examiner* — Lily C Garner
(74) *Attorney, Agent, or Firm* — Nelson Mullins Riley & Scarborough LLP

(57) ABSTRACT

Refueling of a nuclear reactor (40) includes removing a fuel assembly (10). The removal method includes lowering a lifting tool (80) of a crane (44) onto a top of the fuel assembly. The lowered lifting tool including a plurality of downwardly extending elements (82) that surround and vertically overlap a portion (74) of a control rod assembly (70) extending above the top of the fuel assembly. The downwardly extending elements are locked with corresponding mating features (26) at the top of the fuel assembly to connect the lifting tool with the fuel assembly. The connected fuel assembly is moved into a spent fuel pool (42) using the crane, and the lifting tool is disconnected from the top of the fuel assembly by unlocking the downwardly extending elements from the corresponding mating features at the top of the fuel assembly.

12 Claims, 14 Drawing Sheets

Related U.S. Application Data continuation of application No. 13/213,389, filed on Aug. 19, 2011, now abandoned.

(56) References Cited

U.S. PATENT DOCUMENTS

| | | | |
|---|---|---|---|
| 4,110,157 A | | 8/1978 | Jabsen |
| 4,158,599 A | | 6/1979 | Andrews et al. |
| 4,185,943 A | * | 1/1980 | Hautau ................ B23B 39/161 |
| | | | 408/12 |
| 4,303,476 A | * | 12/1981 | Leclercq ................ G21C 3/334 |
| | | | 376/446 |
| 4,427,624 A | | 1/1984 | Marlatt et al. |
| 4,572,817 A | | 2/1986 | Silverblatt |
| 4,647,424 A | | 3/1987 | Meuschke et al. |
| 4,652,425 A | | 3/1987 | Ferrari et al. |
| 4,699,750 A | | 10/1987 | Bova et al. |
| 4,716,015 A | | 12/1987 | Carlson |
| 4,788,028 A | | 11/1988 | Leclerco et al. |
| 4,904,443 A | * | 2/1990 | Carruth ................ G21C 7/14 |
| | | | 376/233 |
| 5,009,839 A | | 4/1991 | King |
| 5,037,605 A | | 8/1991 | Riordan, III |
| 5,282,231 A | | 1/1994 | Adams et al. |
| 5,361,287 A | | 11/1994 | Williamson |
| 5,363,423 A | | 11/1994 | Brashier et al. |
| 5,420,899 A | | 5/1995 | Apple, Jr. et al. |
| 5,778,034 A | | 7/1998 | Tani |
| 5,914,995 A | * | 6/1999 | Meier ................ G21C 3/32 |
| | | | 376/444 |
| 5,930,318 A | | 7/1999 | Baversten et al. |
| 6,049,581 A | | 4/2000 | Mayet et al. |
| 6,115,440 A | | 9/2000 | Evans et al. |
| 6,359,953 B1 | | 3/2002 | Faser et al. |
| 6,619,712 B1 | | 9/2003 | McGovern et al. |
| 6,891,914 B1 | | 5/2005 | Sakashita et al. |
| 10,490,311 B2 | | 11/2019 | Walton et al. |
| 2006/0034413 A1 | | 2/2006 | Jublot |
| 2006/0227923 A1 | | 10/2006 | Brashier et al. |
| 2009/0225925 A1 | | 9/2009 | Eisner et al. |
| 2010/0316181 A1 | | 12/2010 | Thome et al. |
| 2011/0317797 A1 | | 12/2011 | Tomatsu et al. |
| 2013/0044850 A1 | | 2/2013 | Walton et al. |
| 2018/0277270 A1 | | 9/2018 | Walton et al. |

FOREIGN PATENT DOCUMENTS

| | | | | |
|---|---|---|---|---|
| FR | 2905030 A1 | | 2/2008 | |
| GB | 1117265 A | * | 6/1968 | ............ G21C 19/11 |
| GB | 1117265 A | | 6/1968 | |
| JP | S48-67696 A | | 9/1973 | |
| JP | S60-93989 A | | 5/1985 | |
| JP | S62-32396 U | | 2/1987 | |
| WO | 2008132362 A2 | | 11/2008 | |
| WO | 2010071197 A1 | | 6/2010 | |

OTHER PUBLICATIONS

First Office Action dated Dec. 16, 2015 for Chinese Patent Application No. 201210111767.2.

International Search Report and Written Opinion for PCT/US2012/047171 dated Jan. 11, 2013.

Office Action dated Feb. 17, 2016 for EP Application No. 12825470.3.

Office Action dated Jul. 5, 2016 for Japanese Application No. 2014-526008.

Office Action dated Sep. 8, 2016 for Taiwan Application No. 101129367.

Office Action for Canadian Patent Application No. 2,845,700, dated Feb. 5, 2019, 7 pages.

Office Action, Canadian Application No. 2,845,700, dated Apr. 27, 2018, 3 pages.

Report of Reactor project. Sep. 30, 1960. 155 pages. ML051600165. pp. II-6a-II-7c, Figs. 6-6C, 158. available online <http://pbadupws.nrc.gov/docs/ML0516/ML051600165.pdf>.

Second Office Action dated Jul. 20, 2016 for Chinese Application No. 201210111767.2.

* cited by examiner

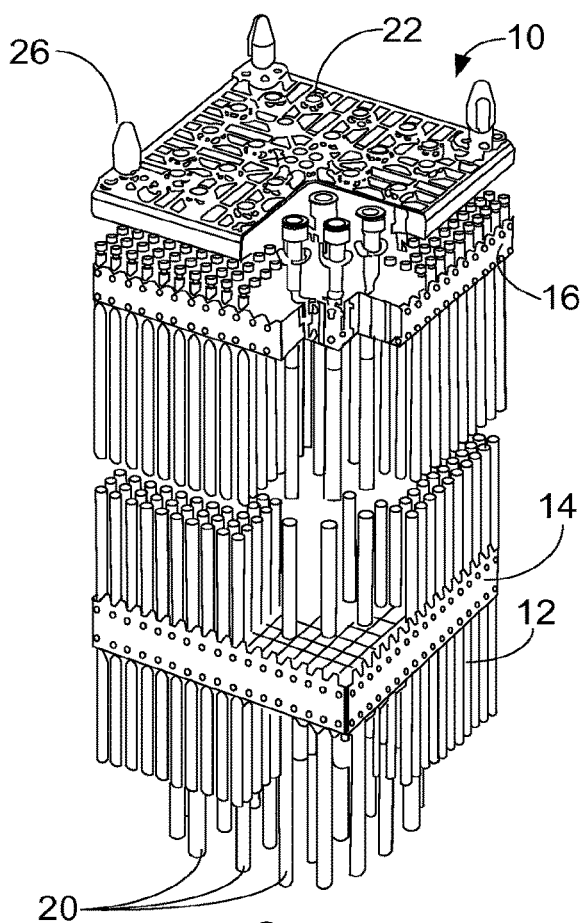
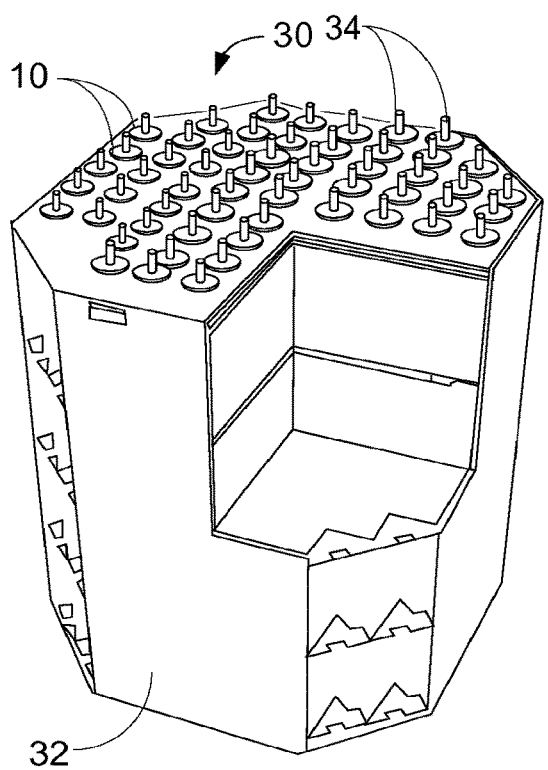
FIG. 2
(PRIOR ART)
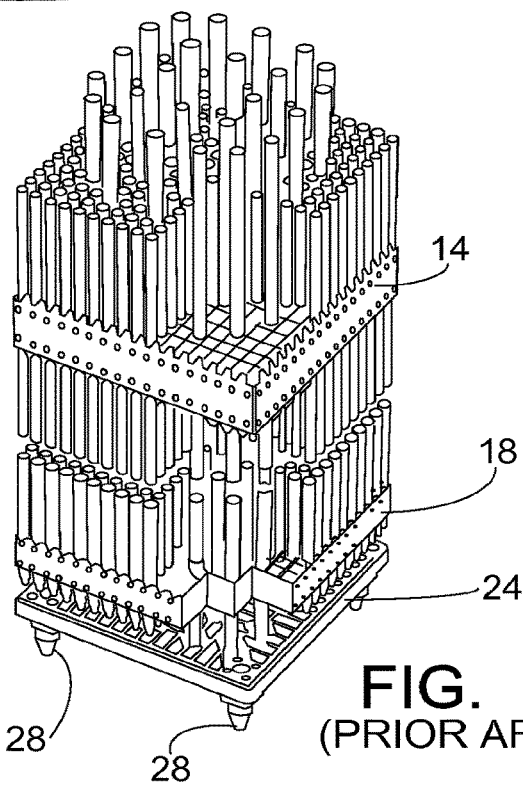
FIG. 1
(PRIOR ART)

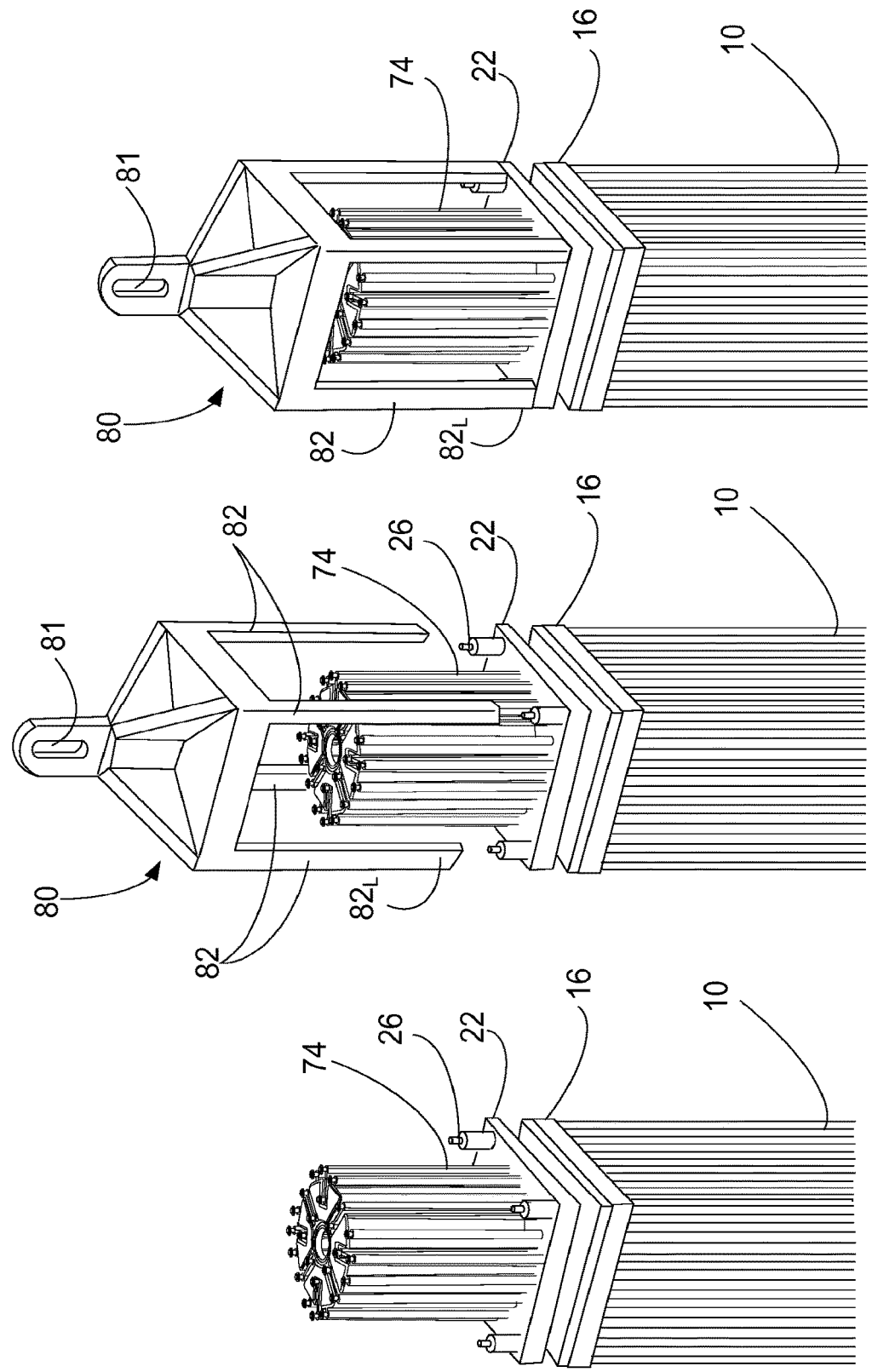

NUCLEAR REACTOR REFUELING METHODS AND APPARATUSES

CLAIM OF PRIORITY

This application is a division of U.S. application Ser. No. 15/970,316 filed on May 3, 2018, now U.S. Pat. No. 10,490,311, which is a continuation of U.S. patent application Ser. No. 13/213,389, filed on Aug. 19, 2011, now abandoned, the entire disclosures of which are incorporated by reference herein.

BACKGROUND

The following relates to the nuclear reactor arts, electrical power generation arts, nuclear reactor control arts, nuclear electrical power generation control arts, and related arts.

Nuclear reactors employ a reactor core comprising a critical mass of fissile material, such as a material containing uranium oxide ($UO_2$) that is enriched in the fissile $^{235}U$ isotope. The fuel rod may take various structural configurations, for example including fissile material as pellets embedded in a ceramic matrix or so forth. To promote safety, it is conventional to assemble the core as rods containing the fissile material. A set of rods is preassembled to form a fuel assembly. Preferably, the mass of fissile material in the fuel assembly remains below critical mass. The fuel assemblies are shipped to the reactor site, and are installed in a grid in the reactor pressure vessel to form the reactor core. To prevent a premature chain reaction, suitable neutron absorbing material is provided during installation, for example by inserting neutron-absorbing control rods into the fuel assemblies before they are brought together in the pressure vessel, and by omitting the neutron moderator (e.g., water ambient) if employed.

With reference to FIGS. 1 and 2, an illustrative example of such an assembly is shown. FIG. 1 shows an illustrative fuel assembly 10 including a set of fuel rods 12 secured together with a controlled spacing by mid-spacer grid elements 14 and by end-spacer grid elements 16, 18. In the illustrative example, the fuel rods 12 form a 17×17 array. The fuel assembly 10 is typically substantially elongated, and is shown in part in FIG. 1 with an indicated gap G. The fuel assembly 10 also suitably includes other elements, such as control rod guide tubes or thimbles 20 through which neutron-absorbing control rods may pass. One or more of these or similar tubes or thimbles may also serve as instrumentation conduits for in-core sensors. Upper and lower nozzle plates 22, 24 may be provided to facilitate coupling of control rods, instrumentation bundles, or so forth into or out of the fuel assembly 10. The illustrative upper and lower nozzle plates 22, 24 include respective upper and lower alignment pins 26, 28 at the corners of the respective nozzle plates 22, 24 for facilitating alignment of the fuel assemblies during installation in the reactor core.

FIG. 2 shows the assembled reactor core 30, including a closely packed grid of fuel assemblies 10 disposed in a core former 32. In FIG. 2, a control rod assembly (CRA) is fully inserted into each fuel assembly 10. In the view of FIG. 2, only an upper support element 34 of the CRA is visible extending above each corresponding fuel assembly 10. The upper support element of each CRA may in be a conventional spider or (as in FIG. 2) a larger element (see "Terminal Elements for Coupling Connecting Rods and Control Rods in Control Rod Assemblies for a Nuclear Reactor", U.S. Ser. No. 12/862,124 filed Aug. 24, 2010, which is incorporated herein by reference in its entirety, for some illustrative examples). The illustrative reactor core 30 includes sixty-nine (69) fuel assemblies, although in general more or fewer fuel assemblies may be included.

The reactor core has a designed lifetime, typically in a range of a year to a few years. The core lifetime is controlled by the reduction in fissile material caused by operation of the nuclear chain reaction. To continue operation, a refueling operation must be performed, in which the spent fuel assemblies are removed and replaced by new fuel assemblies. Typically, this entails shutting down the reactor, opening the pressure vessel and removing any components in order to gain overhead access to the fuel assemblies, and removing the fuel assemblies with the assistance of a crane. To enable coupling with the fuel assembly, each fuel assembly is typically fitted with a box structure with leaf springs mounted on top of the box, or a plate-and-post structure with preloaded helical coil springs mounted between the posts. The fuel assembly is lifted by a grappling mechanism that engages the fixed top plate of the box structure or the movable top plate of the plate-and-post structure via hooks that swing laterally under the top plate in four orthogonal directions. In box designs, the hooks swing outward to engage the top plate of the box, while in plate-and-post designs the hooks swing inward to engage the top plate.

These refueling approaches have substantial disadvantages. The swinging motion of the grappling hooks calls for a large working space proximate to the top of each fuel assembly. However, this working space is constrained by the presence of closely adjacent neighboring fuel assemblies in the array disposed in the core former. Moreover, if the CRA is left fully inserted into the fuel assembly during refueling (which is desirable to maintain suppression of the neutron population in the fuel assembly during the refueling process), then either the spider must be removed entirely (a process entailing individually detaching each of the numerous control rods from the spider), or the spider must be of sufficiently low profile to enable the grappling hooks to operate above the spider.

Disclosed herein are improvements that provide various benefits that will become apparent to the skilled artisan upon reading the following.

BRIEF SUMMARY

In one aspect of the disclosure, a method comprises performing refueling of a nuclear reactor. The refueling includes removing a fuel assembly from a reactor core of the nuclear reactor. The removal method includes: connecting a lifting tool of a crane with a top of the fuel assembly, the lifting tool comprising an assembly of downwardly extending elements, the connecting including locking lower ends of the downwardly extending elements with respective mating features located at a top and periphery of the fuel assembly; moving the fuel assembly connected with the lifting tool into a spent fuel pool using the crane; and releasing the lifting tool from the top of the fuel assembly, the releasing including unlocking the lower ends of the downwardly extending elements from the respective peripherally located mating features at the top and periphery of the fuel assembly.

In another aspect of the disclosure, a method comprises performing refueling of a nuclear reactor. The refueling includes removing a fuel assembly having a control rod assembly (CRA) inserted in the fuel assembly from a reactor core of the nuclear reactor. The removal method includes: lowering a lifting tool of a crane onto a top of the fuel assembly, the lowered lifting tool including a plurality of downwardly extending elements that surround and vertically overlap a portion of the CRA extending above the top of the fuel assembly; locking the downwardly extending elements of the lowered lifting tool with corresponding mating features at the top of the fuel assembly in order to connect the lifting tool with the fuel assembly; moving the fuel assembly connected with the lifting tool into a spent fuel pool using the crane; and disconnecting the lifting tool from the top of the fuel assembly in the spent fuel pool by unlocking the downwardly extending elements from the corresponding mating features at the top of the fuel assembly.

In another aspect of the disclosure, an apparatus comprises a lifting tool including an upper end configured for attachment with a crane, and a plurality of downwardly extending elements surrounding an open central region disposed below the upper end, lower ends of the downwardly extending elements being configured to mate with mating features at the top of a fuel assembly of a nuclear reactor core.

In another aspect of the disclosure, an apparatus comprises: a nuclear fuel assembly including mating features at a top of the nuclear fuel assembly; and a lifting tool including an upper end configured for attachment with a crane and a plurality of downwardly extending elements surrounding an open central region disposed below the upper end, lower ends of the downwardly extending elements being configured to mate with the mating features at the top of the nuclear fuel assembly.

In another aspect of the disclosure, an apparatus comprises: a nuclear fuel assembly including mating features at a top of the nuclear fuel assembly; a control rod assembly (CRA) inserted in the nuclear fuel assembly with an upper end of the CRA extending out of the top of the nuclear fuel assembly; and a lifting tool including an upper end configured for attachment with a crane and a plurality of downwardly extending elements surrounding an open central region disposed below the upper end, lower ends of the downwardly extending elements being configured to mate with the mating features at the top of the nuclear fuel assembly. The open central region of the lifting tool that is surrounded by the plurality of downwardly extending elements is configured to receive the upper end of the CRA when the lower ends of the downwardly extending elements mate with the mating features at the top of the nuclear fuel assembly.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 1 and 2 show a nuclear fuel assembly and a nuclear reactor core, respectively, according to the prior art.

FIGS. 11, 12, 13, 14, 15, 15A, 16, and 16A show perspective views (with partial cutaway in the case of FIGS. 15A and 16A) of various operations of the process flow of FIG. 10.

DETAILED DESCRIPTION OF THE PREFERRED EMBODIMENTS

Figure 3:
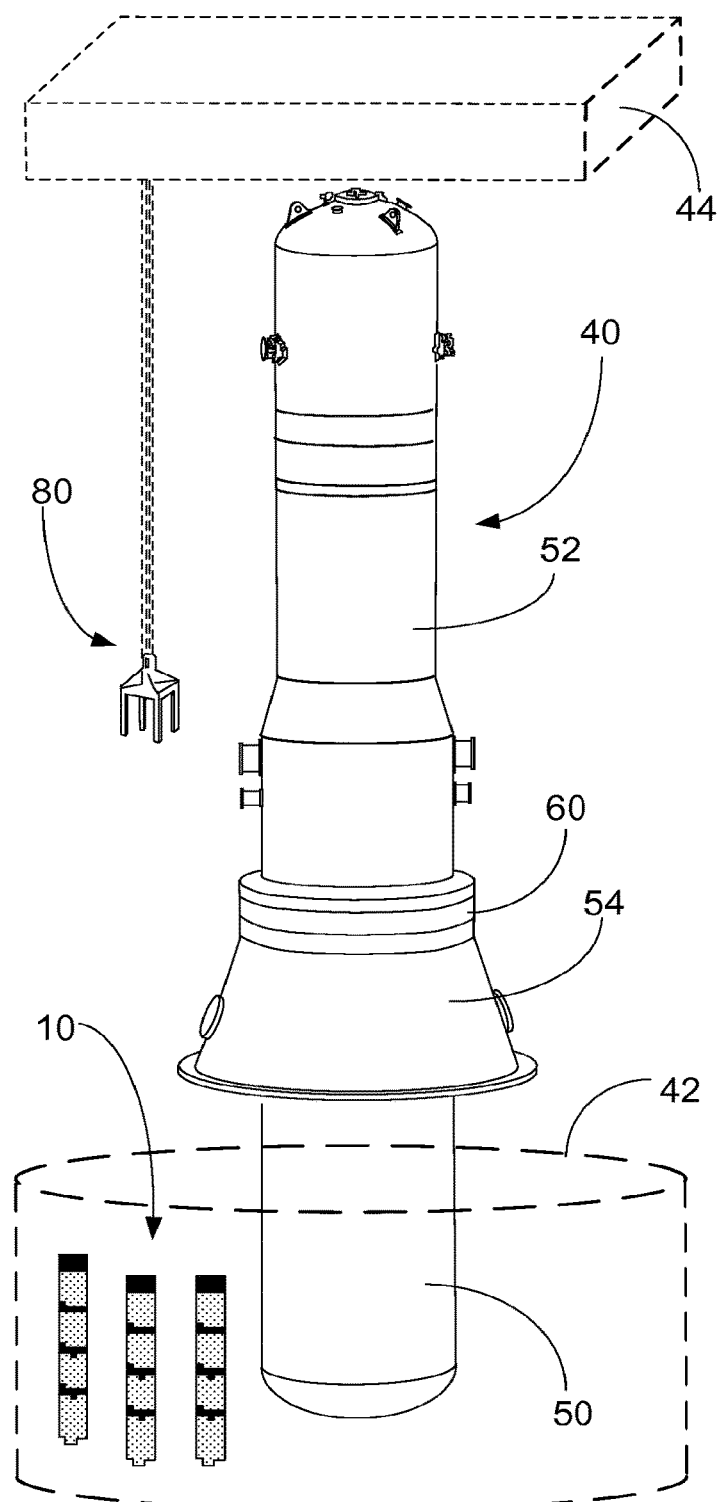
FIG. 3 shows a diagrammatic perspective view of a nuclear reactor and selected associated components.
Figure 4:
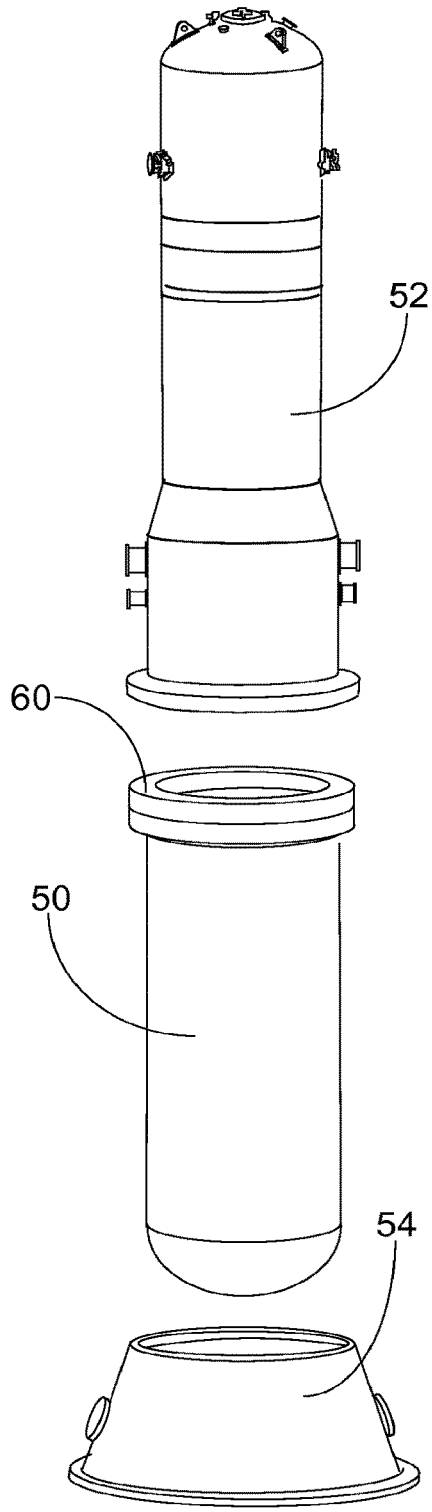
FIG. 4 shows an exploded perspective view of the pressure vessel of the nuclear reactor of FIG. 3.
Figure 5:
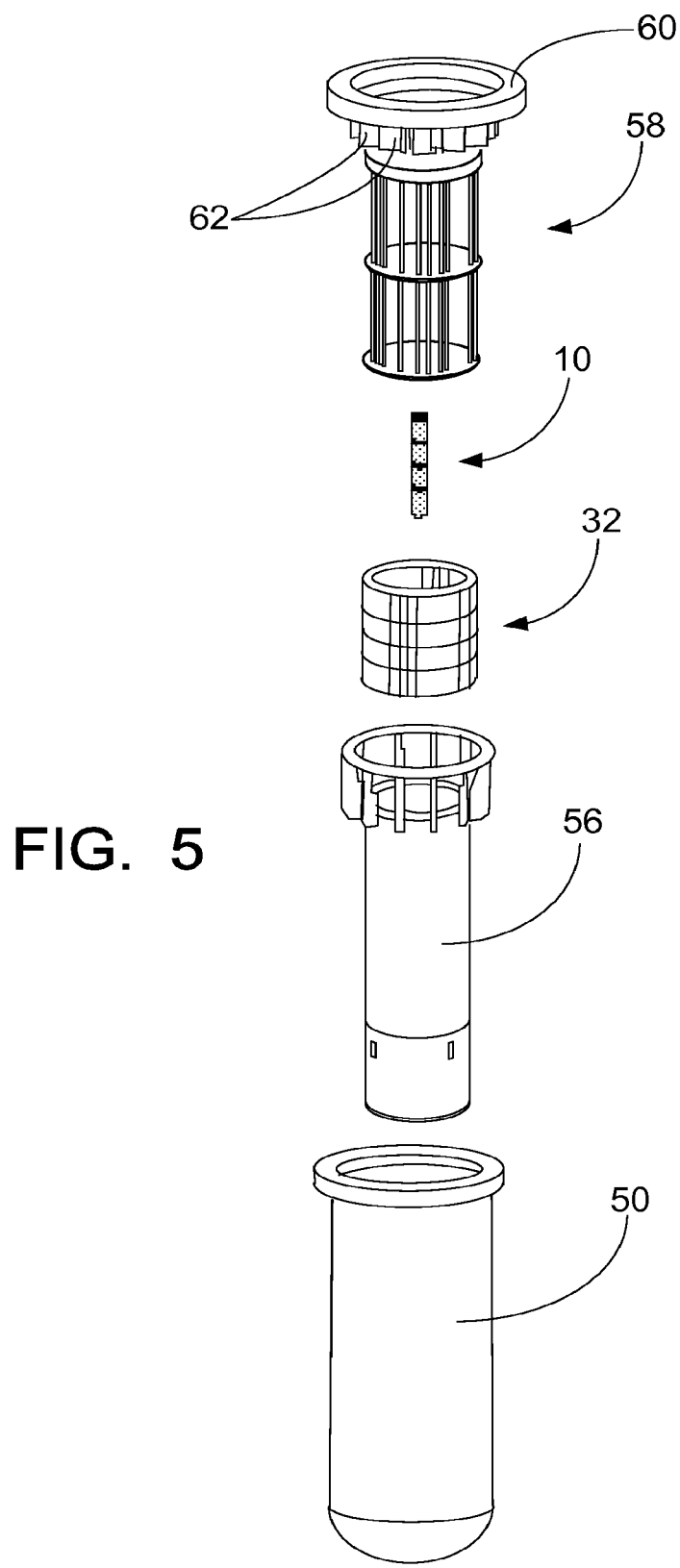
FIG. 5 shows an exploded perspective view of the lower vessel portion of the pressure vessel of FIG. 4 including selected internal components.

With reference to FIGS. 3-5, an illustrative nuclear reactor is shown. FIG. 3 shows the nuclear reactor 40 in conjunction with a diagrammatically indicated spent fuel pool 42 and a diagrammatically indicated crane 44. FIG. 4 shows an exploded view of the pressure vessel of the nuclear reactor of FIG. 3. The pressure vessel includes a lower vessel portion 50, an upper vessel portion 52, and a skirt or support structure 54. In the illustrative arrangement, the pressure vessel is mounted vertically (as shown) with at least part of the lower vessel portion 50 disposed below ground level. The bottom of the skirt or support structure 54 is at ground level and supports the pressure vessel and/or biases the pressure vessel against tipping. In the illustrative example of FIG. 3, the spent fuel pool 42 is a below-ground pool containing water and optional additives such as, by way of illustrative example, boric acid (a soluble neutron poison). FIG. 5 shows an exploded perspective view of the lower vessel portion 50 including selected internal components. The lower vessel 50 contains the nuclear reactor core comprising the core former 32 and an array of fuel assemblies 10 (only one of which is shown by way of example in FIG. 5). The reactor core is disposed in and supported by the core former 32 which is in turn disposed in and supported by a core basket 56, which may include radiation shielding, optional emergency coolant tubing (not shown), or so forth.

The illustrative nuclear reactor includes upper internals 58 which include wholly internal control rod drive mechanism (CRDM) units. In the illustrative example, the upper internals 58 are supported by a mid-flange 60 that also forms a structural joint of the pressure vessel (being disposed at the junction between the lower and upper vessel portions 50, 52). Alignment between the fuel assemblies 10 and the upper internals 58 is suitably provided by the upper alignment pins 26 at the corners of the upper nozzle plates 22 of the fuel assemblies 10. These pins 26 are designed to accommodate the differential thermal expansion between the fuel assembly 10 and the reactor internals 58 and the fuel assembly growth due to irradiation without losing engagement.

The illustrative nuclear reactor is a thermal nuclear reactor employing light water ($H_2O$) as a primary coolant that also serves as a neutron moderator that thermalizes neutrons to enhance the nuclear reaction rate. Alternatively, deuterium dioxide ($D_2O$) is contemplated as the coolant/moderator. The primary coolant optionally contains selected additives, such as optional boric acid which, if added, acts as a neutron poison to slow the reaction rate. The pressure vessel suitably includes a cylindrical central riser or other internal compartments or structures (details not shown) to guide circulation of the primary coolant in the pressure vessel. The primary coolant circulation may be natural circulation caused by the heating of the primary coolant in the vicinity of the reactor core, or may be assisted or generated by illustrative primary coolant pumps 62 also mounted via the mid-flange 60.

Although not illustrated, in some embodiments the nuclear reactor is intended to generate steam. Toward this end, primary coolant heated by the reactor core flows through a primary loop that is in thermal communication with a secondary coolant loop through which secondary coolant flows. Heat transfer from the primary loop to the secondary loop heats the secondary coolant and converts it to steam. The thermally coupled primary/secondary coolant loops thus define a steam generator. In some embodiments, the steam generator is external to the pressure vessel, while in other embodiments the steam generator is internal to the pressure vessel, for example mounted in the upper pressure vessel portion 52 in some contemplated embodiments. The steam may for example, be employed to drive a turbine of a generator of an electrical power plant, thus generating electrical power from the nuclear reaction.

The illustrative nuclear reactor is of a type generally known as a pressurized water nuclear reactor (PWR), in which the primary coolant (water) is maintained in a superheated state during normal operation. This is suitably accomplished by maintaining a steam bubble located at the top of the upper vessel portion 52 at a desired pressure during normal reactor operation. Alternatively, the nuclear reactor could be configured as a boiling water reactor (BWR) in which the primary coolant is maintained in a boiling state.

The illustrative nuclear reactor 40 and other components, e.g. spent fuel pool 42 and diagrammatically represented crane 44, is shown as an example. Numerous variations are contemplated. For example, the pressure vessel can have other portioning, such as having a removable top or "cap" section, and can have access manways provided at various points for maintenance or so forth. In some embodiments the entire pressure vessel may be located underground. Similarly, while the illustrative spent fuel pool 42 is below-ground and surrounds the lower vessel portion 50, more generally the spent fuel pool can be located anywhere within "reach" of the crane 44, and may in some embodiments be above-ground (or, conversely, may be buried deep underground with suitable access from above). The reactor 40 and auxiliary components 42, 44 are typically housed in a concrete or steel containment structure, which is also not shown. The crane 44 is diagrammatically shown, and may in general have any suitable configuration that provides the desired horizontal and vertical travel, lifting capacity, and so forth while fitting within the containment structure. Some suitable crane configurations include an overhead crane configuration, a gantry crane configuration, a tower or hammerhead crane configuration, or so forth.

Figure 6:
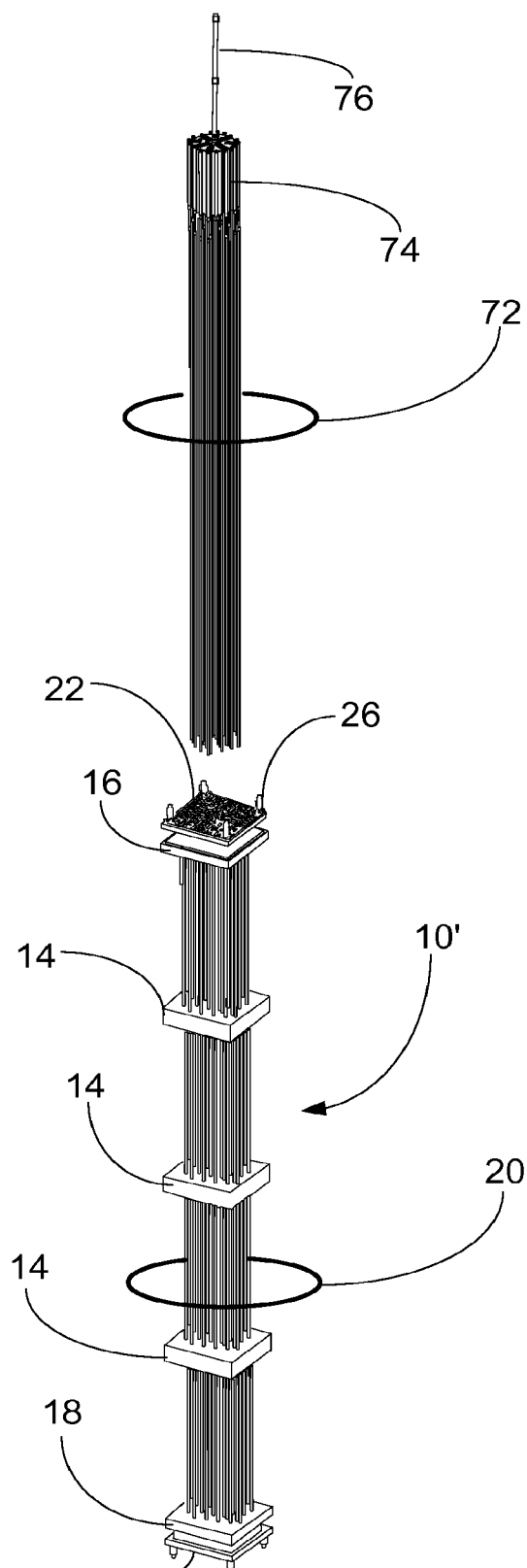
FIG. 6 shows a perspective view of a nuclear fuel assembly with the fuel rods omitted to reveal the control rod guide tubes or thimbles, with a control rod assembly (CRA) positioned in a withdrawn position above the fuel assembly.
Figure 7:
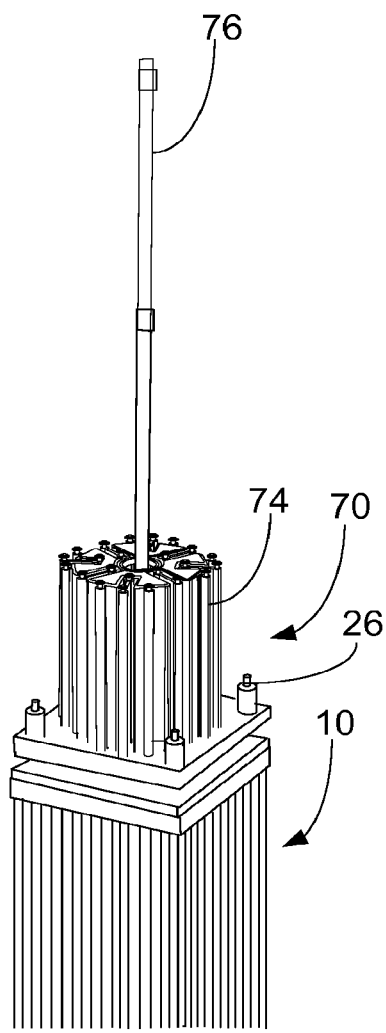
FIG. 7 shows a perspective view of a nuclear fuel assembly with a control rod assembly (CRA) inserted in the fuel assembly.
Figure 8:
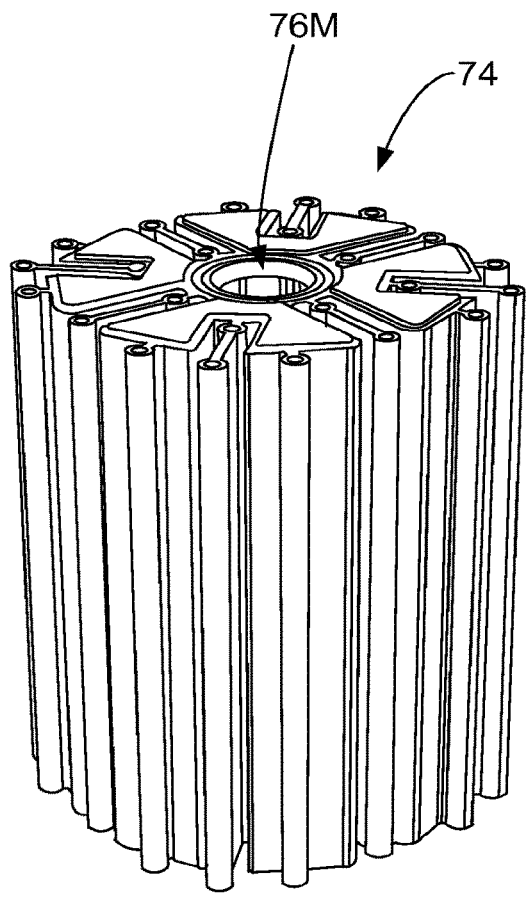
FIG. 8 shows an isolated perspective view of the upper support element of the CRA of FIGS. 6 and 7.

With continuing reference to FIGS. 3-5 and with further reference to FIGS. 6-9, reactivity control is suitably achieved using a control rod assembly (CRA) 70 associated with each fuel assembly 10. FIG. 6 shows an illustrative fuel assembly with the fuel rods omitted, denoted by reference number 10'. By omitting the fuel rods for illustrative purposes, the diagrammatic element 10' reveals that the control rod guide tubes or thimbles 20 through which neutron-absorbing control rods may pass extend through the entire (vertical) height of the fuel assembly. Corresponding control rods 72 of the CRA 70 are shown in the fully withdrawn position in FIG. 6 (that is, fully withdrawn out of the guide tubes or thimbles 20). The CRA 70 also includes upper support element 74 that secures the bundle of control rods 72 together in a pattern matching that of the guide tubes or thimbles 20. The upper support element 74 may be a conventional spider; in the illustrative example, however, the upper support element 74 is a larger element intended to provide various benefits such as a longer (vertical) length over which to secure the upper ends of the control rods 72, and optionally increased mass for the CRA 70. The illustrative upper support element 74 is shown in isolation in FIG. 8, and in side sectional view in FIG. 9. The illustrative upper support element 74 is further described in "Terminal Elements for Coupling Connecting Rods and Control Rods in Control Rod Assemblies For a Nuclear Reactor", U.S. Ser. No. 12/862,124 filed Aug. 24, 2010, which is incorporated herein by reference in its entirety. FIG. 7 shows the CRA 70 fully inserted into the fuel assembly 10. It will be noted in FIG. 7 that a portion of the CRA 70, including at least the upper support element 74, extends above the top of the fuel assembly 10 in the fully inserted position.

Figure 9:
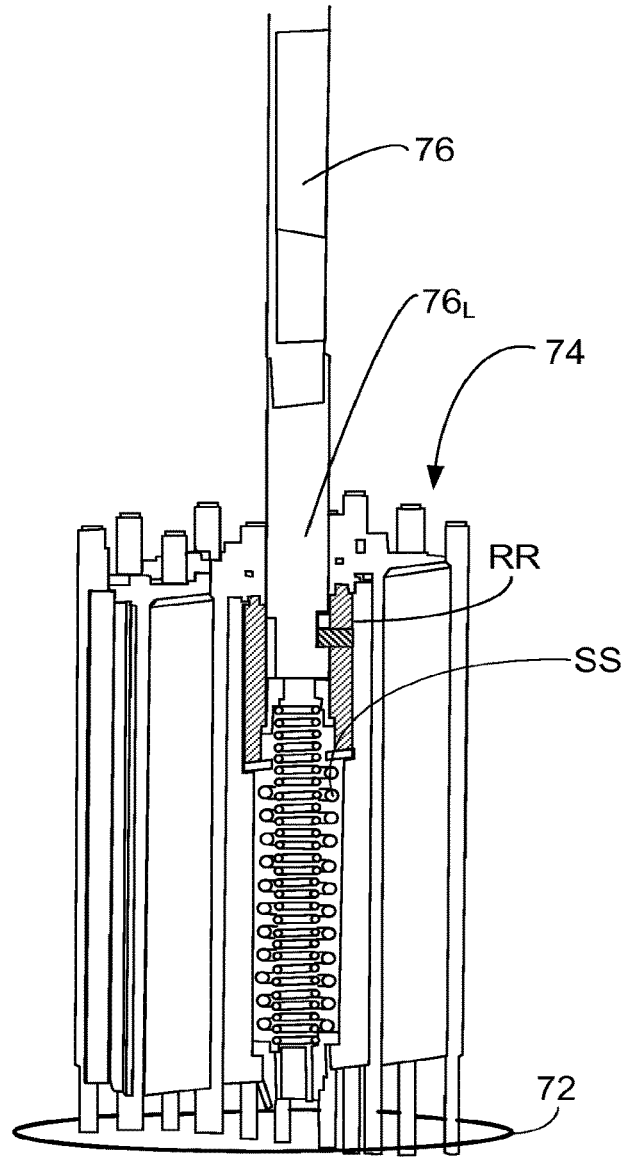
FIG. 9 shows an enlarged perspective sectional view of the CRA focusing on the upper support element and showing a J-lock coupling between the connecting rod and the CRA.

With continuing reference to FIGS. 6-9, the CRA 70 is inserted into the fuel assembly 10 (as per FIG. 7), or withdrawn from the fuel assembly 10 (as per FIG. 6) in order to control the reaction rate of reactivity of the reactor core. The control rods 72 comprise a neutron-absorbing material—accordingly, as the control rods 72 are inserted further into the fuel assembly 10 the reaction rate is reduced. In the fully inserted position (FIG. 6) the reaction is typically extinguished entirely. A connecting rod 76 is employed in order to raise or lower the CRA 70. As illustrated in FIGS. 6, 7, and 9, the lower end of the connecting rod 76 is connected with the upper support element 74 of the CRA 70. The opposite upper end of the connecting rod 76 is not illustrated, but is connected with a suitable control rod drive mechanism (CRDM) unit. In the illustrative embodiment (see FIG. 5) the CRDMs are wholly internal and are part of the upper internals 58 contained within the pressure vessel. Alternatively, the CRDMs may be mounted externally above the pressure vessel (as is typical in a PWR) or externally below the pressure vessel (as is typical in a BWR), with the connecting rods passing through suitable vessel penetrations to connect with the corresponding CRA.

With returning reference to FIGS. 3-5, the reactor core has a sufficient quantity of fissile material to support reactor operation for a designed operational time period, which is typically of order one to a few years, although shorter or longer designed periods are also contemplated. Thereafter, the nuclear reactor 40 is refueled and then restarted. Toward this end, the crane 44 includes or is operatively connected with lifting tool 80 that is designed to connect with one of the fuel assemblies. During refueling, the crane 44 operating in conjunction with the lifting tool 80 transfers spent fuel assemblies out of the lower vessel 50 and deposits the spent fuel assemblies in the spent fuel pool 42. By way of diagrammatic illustration, FIG. 3 shows several spent fuel assemblies $10_{spent}$ which have been transferred into the spent fuel pool 42. (It should be noted that while the illustrative spent fuel pool 42 is below-ground and surrounds the lower vessel portion 50, more generally the spent fuel pool can be located anywhere within "reach" of the crane 44, and may in some embodiments be above-ground.) The crane 44 operating in conjunction with the lifting tool 80 also transfers (i.e., loads) new fuel assemblies into the lower vessel 50, and more particularly into the core former 32.

With reference to FIGS. 10-16, the refueling process is described. In an operation S1, the reactor is shut down preparatory to the refueling. The shutdown S1 includes inserting each CRA 70 into its corresponding fuel assembly 10, producing the inserted configuration shown in FIG. 7. A suitable time delay is allowed in order for the reactor to cool down to a sufficiently low temperature to allow opening of the pressure vessel. Some primary coolant may also be removed from the pressure vessel in order to reduce the water level. In an operation S2 (see also FIGS. 3-5), the upper vessel portion 52 is removed (for example, using the crane 44). The effect of the operation S2 is to provide access to the (now spent) fuel assemblies 10 disposed in the core former 32. In an operation S3, for each fuel assembly 10 the connecting rod 76 is detached from the corresponding CRA 70 so as to leave the combination of the fuel assembly 10 and the inserted CRA 70, as shown in FIG. 11.

With brief reference to FIG. 9, a suitable approach for performing the removal S3 of the connecting rod 76 is described. In this embodiment, the lower end $76_L$ of the connecting rod 76 terminates in a bayonet or (illustrated) J-lock coupling that is designed to lock into a mating receptacle $76_M$ (see FIG. 8) of the upper support element 74 of the CRA 70. The perspective sectional view of FIG. 9 shows the lower end $76_L$ of the connecting rod 76 in the locked position biased by a spring SS against a retaining feature RR inside the mating receptacle $76_M$ of the CRA upper support element 74. Thus, by pressing the connecting rod 76 downward against the bias of the spring SS and rotating the connecting rod 76 to disengage from the retaining feature RR, the connecting rod 76 is released from the CRA upper support element 74. More generally, a bayonet, J-lock, or other "quick-release" type rotatable coupling can be employed to enable the operation S3 to be quickly performed, with the "groove" and "pin" or other retaining combination being variously disposed (e.g., with the groove on the connecting rod and the pin or pins on the CRA receptacle, or vice versa). Some further illustrative description is set forth in "Terminal Elements for Coupling Connecting Rods and Control Rods in Control Rod Assemblies for a Nuclear Reactor", U.S. Ser. No. 12/862,124 filed Aug. 24, 2010, which is incorporated herein by reference in its entirety. Although a quick-release approach is advantageous, it is also contemplated to employ a different approach for performing the operation S3—for example, the connecting rod may be permanently connected with the CRA (for example, by a weld or the like), and the operation S3 may entail cutting the connecting rod at a point at or near its junction with the CRA.

Figure 10:
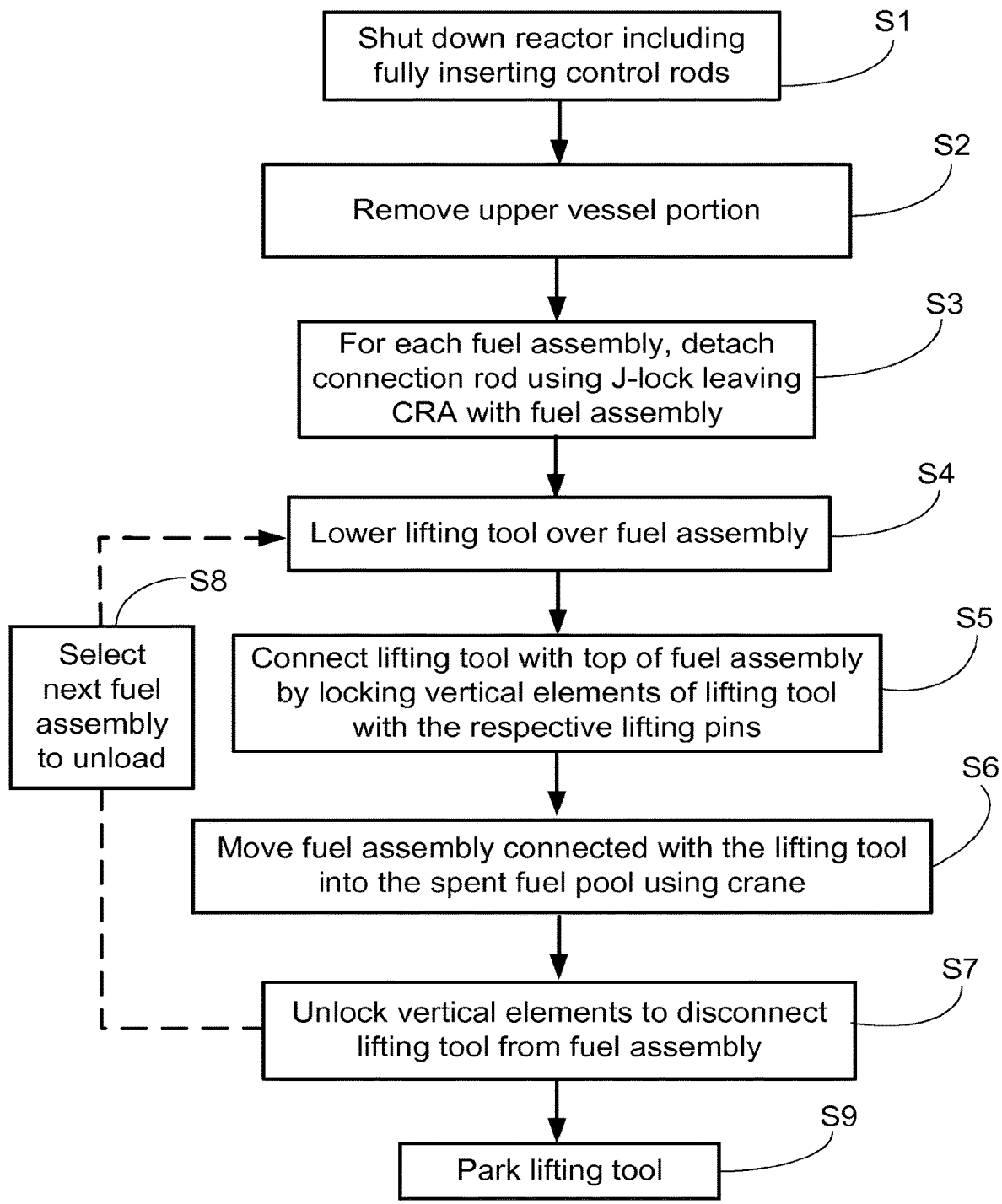
FIG. 10 diagrammatically shows a refueling process flow including those portions related to unloading spent nuclear fuel assemblies from the reactor.

With continuing reference to FIG. 10, after completion of the operation S3 the resulting unit includes the fuel assembly 10 with the CRA 70 inserted, with a top portion of the CRA 70 including the upper support element 74 extending above the top of the fuel assembly 10. This is illustrated in FIG. 11. In an operation S4 (see also FIG. 12), the lifting tool 80 is lowered onto the top of the fuel assembly 10. As seen in FIG. 12, the lifting tool 80 includes an upper end 81 configured for attachment with the crane 44. In the illustrative lifting tool 80, the upper end 81 includes a loop for attachment with the cable or arm of the crane 44. The lifting tool 80 also includes a plurality of downwardly extending elements 82, namely four downwardly extending rods or bars 82 in the illustrative example, that surround and vertically overlap the portion of the CRA 70 extending above the top of the fuel assembly 10 (e.g., the upper support element 74). The illustrative downwardly extending elements 82 are vertical rods or bars that are aligned such that lower ends $82_L$ of the downwardly extending elements 82 of the lowered lifting tool 80 align with respective peripherally located mating features at a top and periphery of the fuel assembly 10. In the illustrative embodiment, the upper alignment pins 26 of the fuel assembly 10 located at the corners of the upper nozzle plate 22 also serve as the mating features 26 (namely lifting pins 26 in the illustrative example) at a top and periphery of the fuel assembly 10. However, other mating features are also contemplated. For example, the mating features can be protrusions, openings, or recesses at a top and periphery of the fuel assembly.

The mating features (e.g., lifting pins 26) are designed to be weight-bearing such that the entire fuel assembly 10 can be raised upward by lifting on the mating features. In the case of the illustrative fuel assembly 10, this is accomplished by constructing the upper and lower nozzle plates 22, 24, the control rod guide tubes or thimbles 20, and the spacer grid elements 14, 16, 18 as a welded assembly of steel or another suitable structural material (best seen as the structure 10' in FIG. 6). The lifting pins 26 at a top and periphery of the fuel assembly 10 are secured to the upper nozzle plate 22 by welding, a threaded connection, a combination thereof, or another suitably load-bearing connection.

Figure 14:
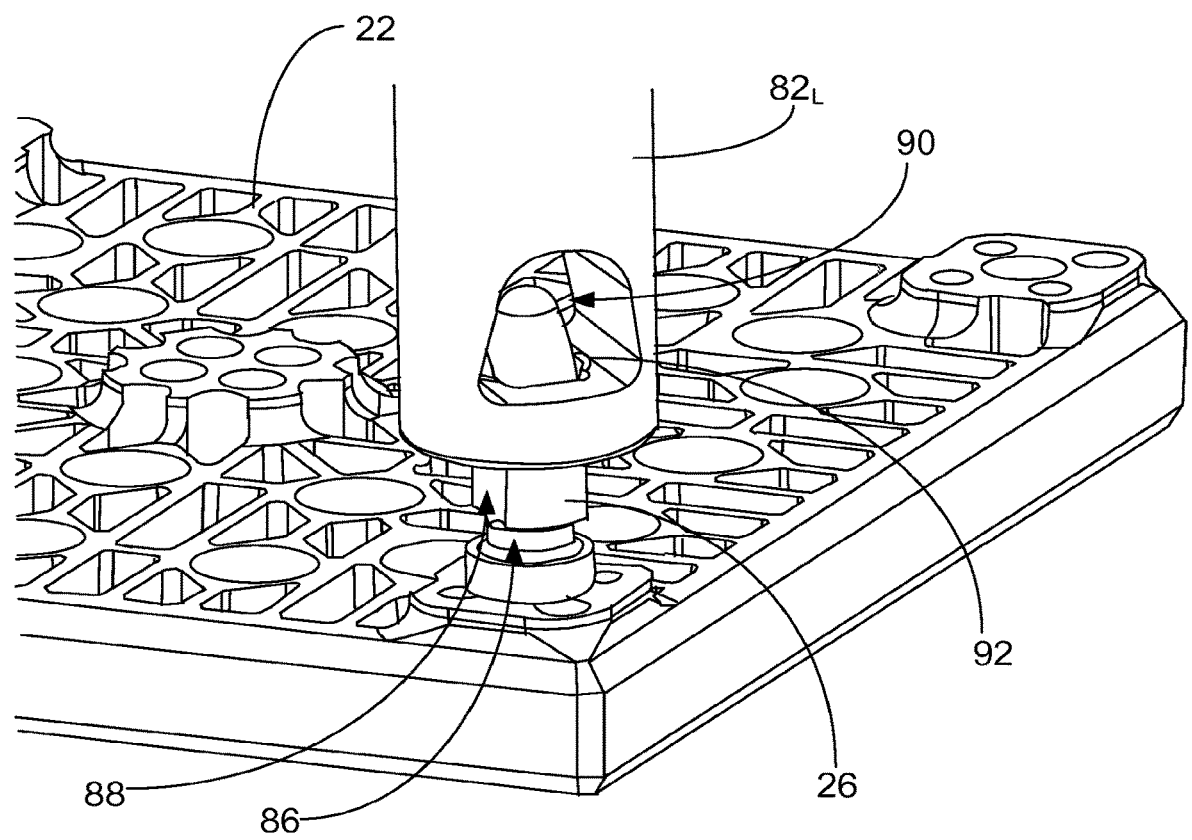
Figure 15:
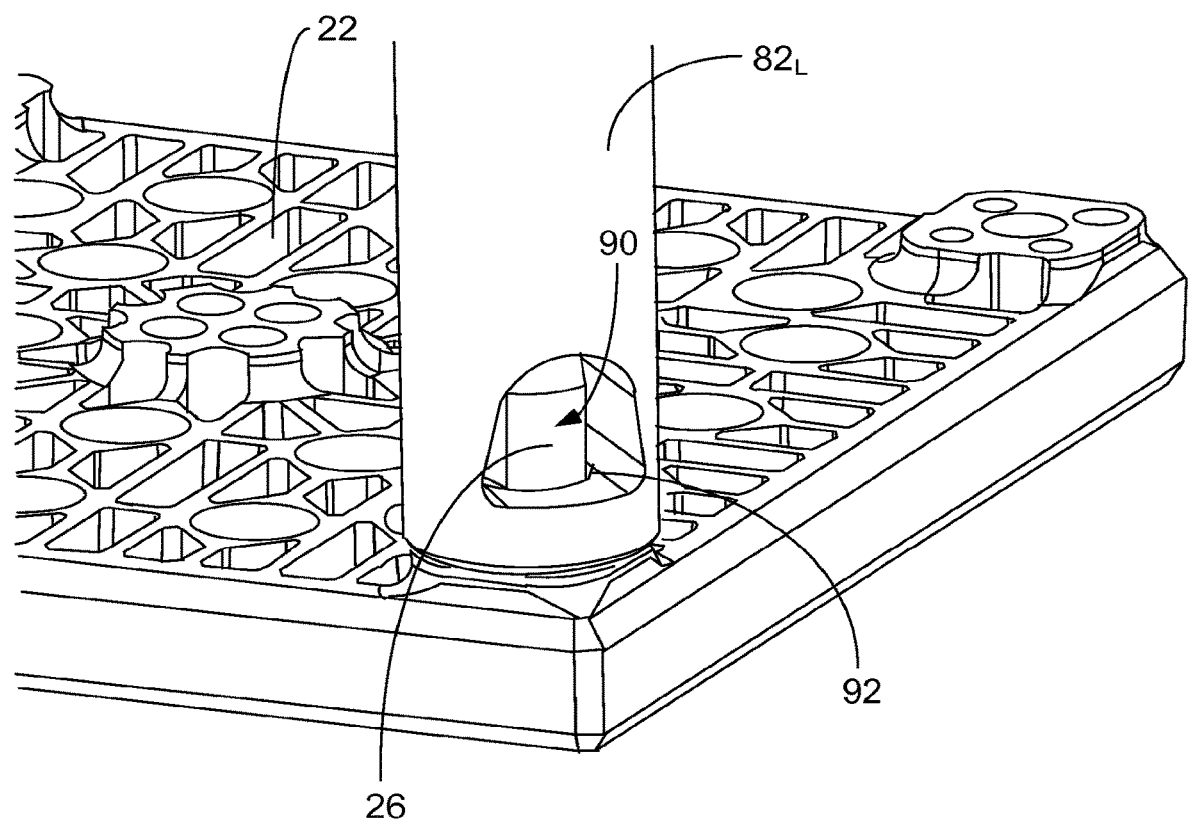
Figure 15A:
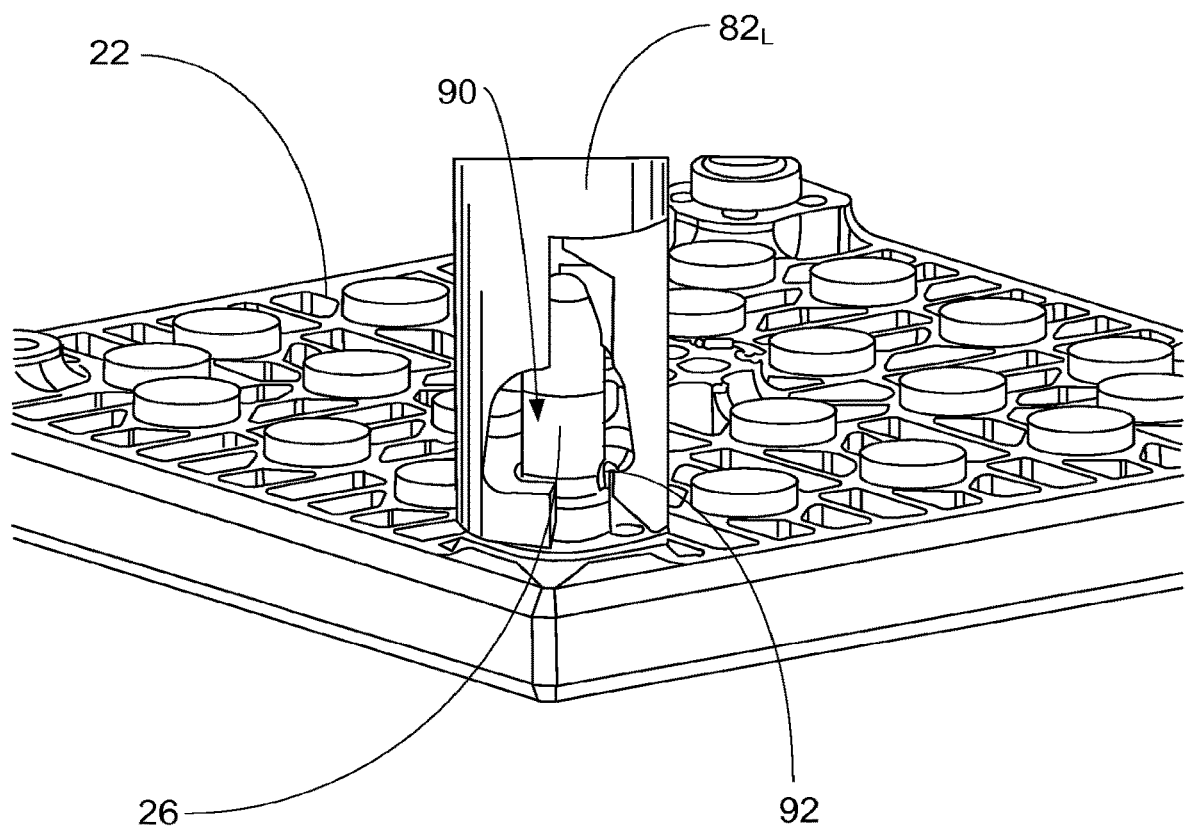
Figure 16:
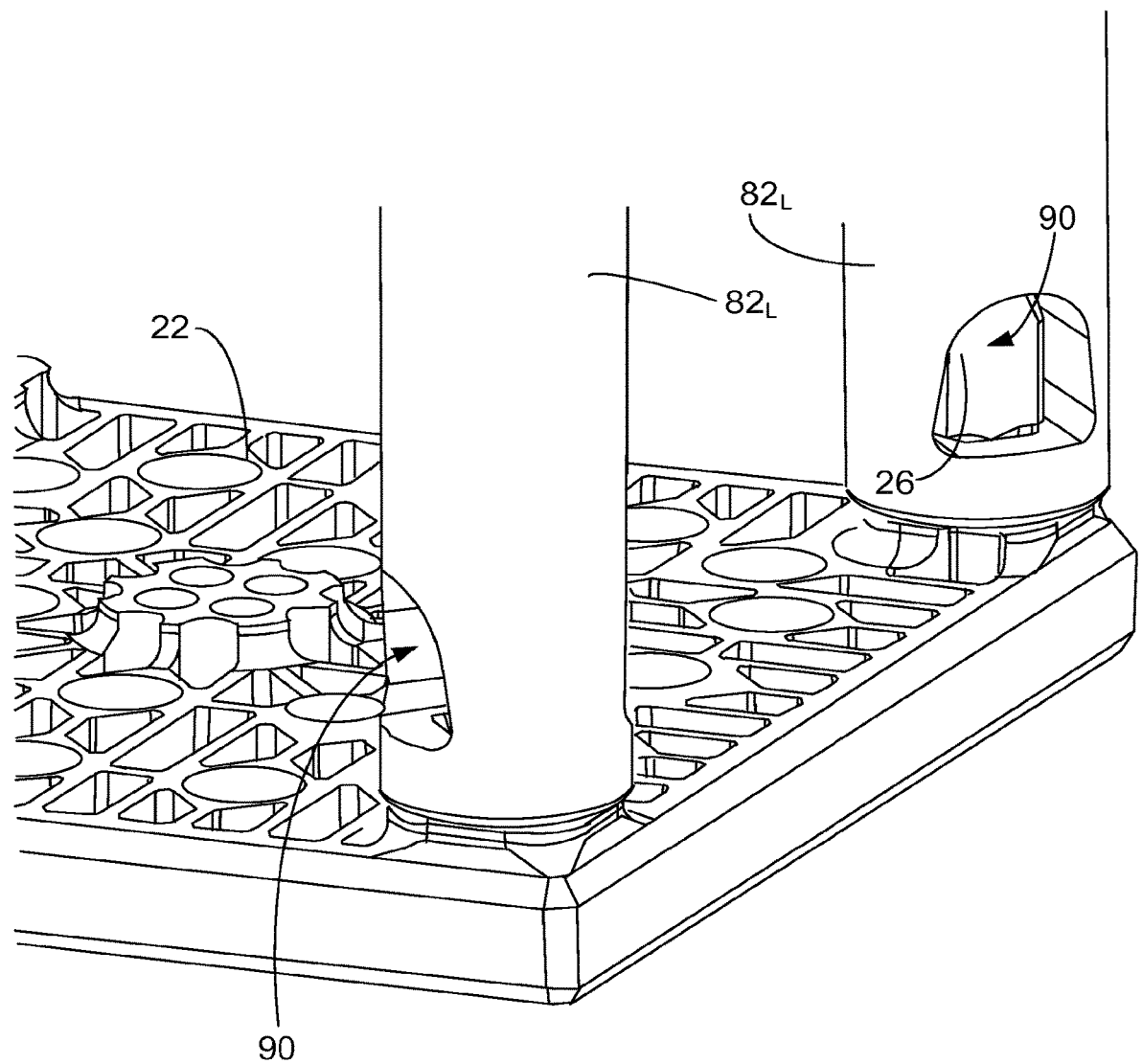
Figure 16A:
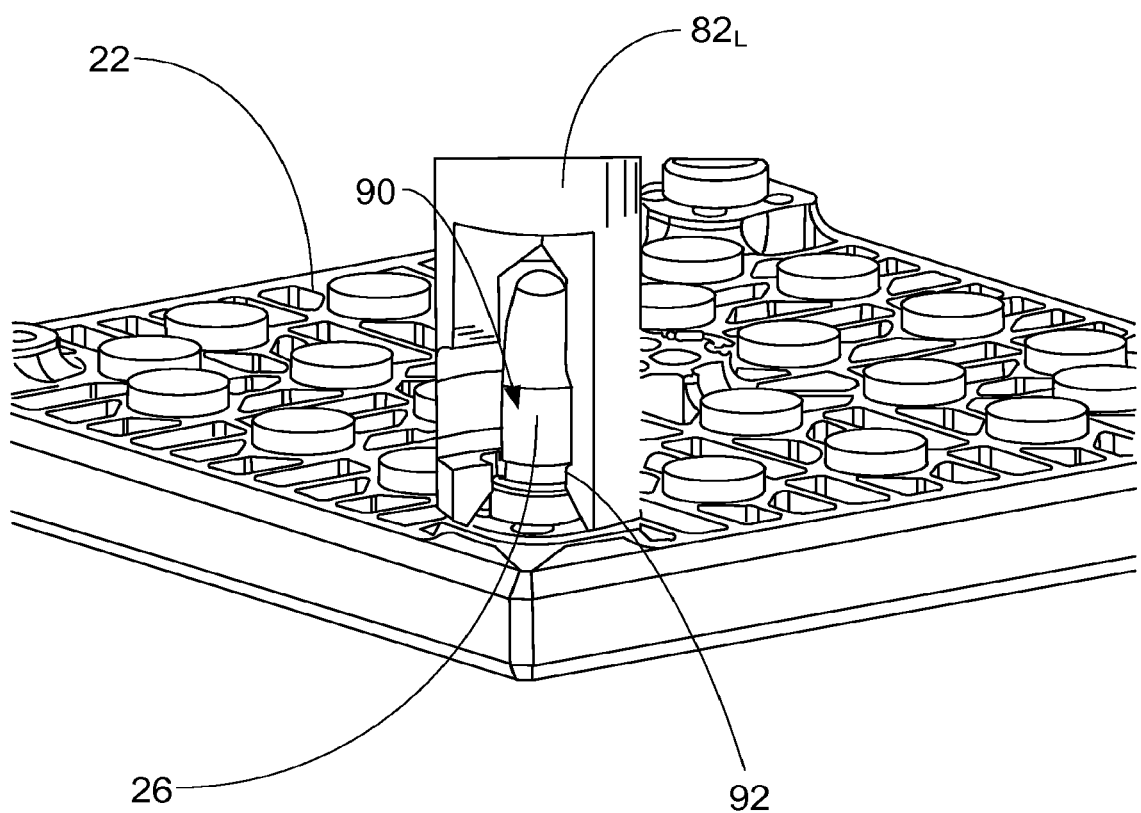

With continuing reference to FIG. 10 and with further reference to FIGS. 14, 15, 15A, 16, and 16A, in an operation S5 the lowered lifting tool 80 is connected with the top of the fuel assembly 10. The connection operation S5 includes locking the lower ends $82_L$ of the downwardly extending elements 80 with the respective peripherally located mating features, e.g. lifting pins 26, at the top and periphery of the fuel assembly 10. In the illustrative approach (see FIGS. 14, 15, 15A, 16, and 16A), the locking operation is performed by rotating at least the lower ends $82_L$ of the downwardly extending elements 80 to lock the lower ends disposed over (as illustrated) or inside the respective lifting pins 26 with the respective lifting pins 26. Toward this end, the lower ends $82_L$ and the respective lifting pins 26 define a lockable bayonet coupling. FIG. 14 shows an enlarged view of one of the lower ends 82L aligned with and being lowered over the respective lifting pin 26. In this view a groove 86 in the lifting pin 26 is visible, as well as a narrowed portion 88 of the lifting pin 26. These features 86, 88 are designed to cooperate with a recess 90 in the lower end $82_L$ with a narrowed region 92 to form a rotationally engaging lock. FIG. 15 shows an enlarged view of the lower end 82L fully lowered over the lifting pin 26. FIG. 15A shows the view of FIG. 15 with partial cutaway of the lower end $82_L$ to reveal internal components of the (unlocked) locking configuration. FIG. 16 shows an enlarged view of the lower end 82L after a rotation of about 90°. This rotation causes the narrowed region 92 to move into the groove 86 to form the lock. FIG. 16A shows the view of FIG. 16 with partial cutaway of the lower end $82_L$ to reveal internal components of the (locked) locking configuration.

In other embodiments, other rotationally locking "quick-release" configurations can be employed. For example, in another contemplated embodiment the J-lock coupling shown in FIG. 9 for coupling the connecting rod 76 with the CRA upper support element 74 can be used in coupling the lower end of the downwardly extending rod or bar with a mating recess at the top and periphery of the fuel assembly. Another rotationally locking quick-release configuration contemplated for use in the lower ends of the downwardly extending elements of the lifting tool are threaded connections. In this embodiment, the lower ends have threads that mate with threaded holes located at the top periphery of the nuclear fuel assembly. The locking in this case is a frictional lock obtained by rotating the lower ends to thread into the threaded holes until a designed torque is reached.

Figure 17:
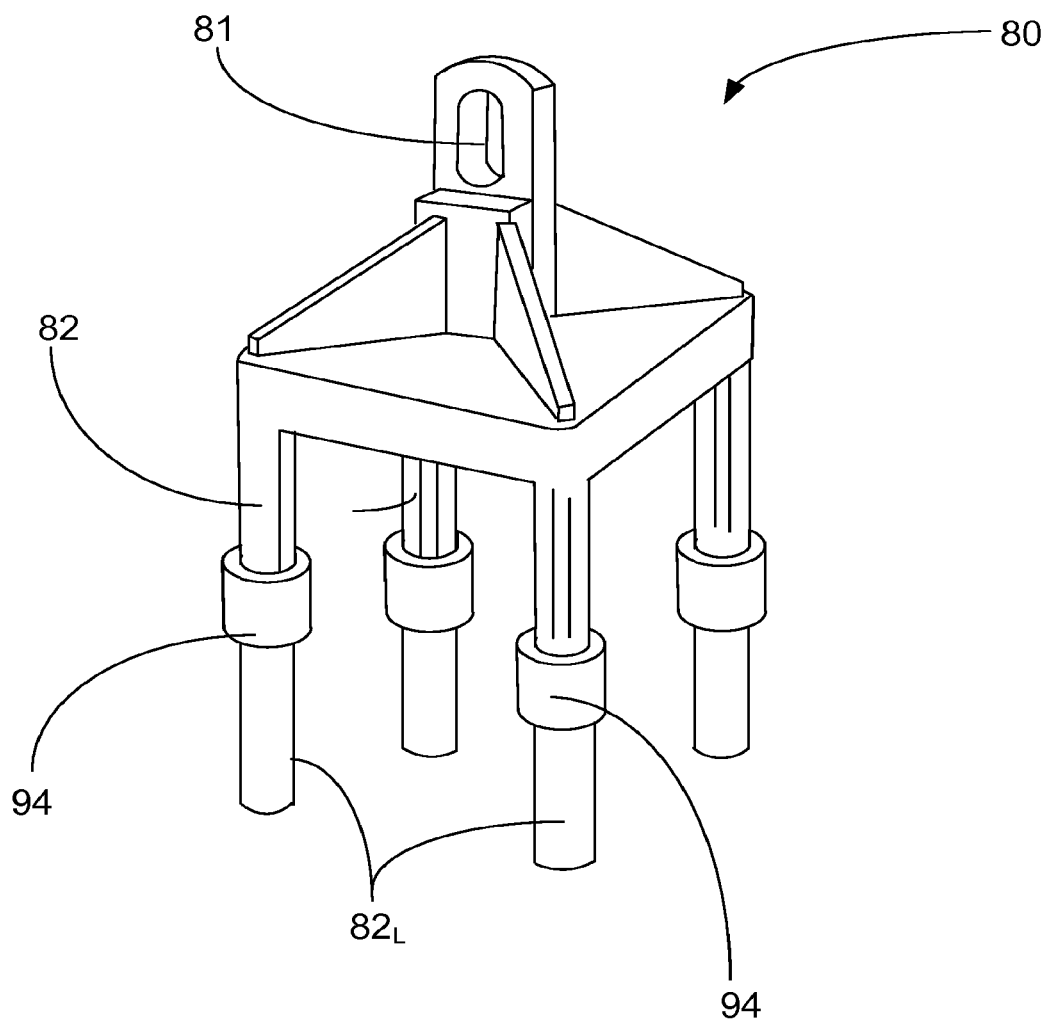
FIG. 17 shows an illustrative embodiment of the lifting tool including diagrammatically indicated motors for rotating the lower ends of the downwardly extending elements of the lifting tool to engage the locks.

With reference to FIG. 17, in any embodiment employing a rotational lock, the downwardly extending elements, or at least their lower ends, should include motorized rotation capability. In an illustrative example shown in FIG. 17, each downwardly extending rod or bar 82 includes a diagrammatically indicated motor 94 providing the motorized rotation of the lower end $82_L$. Although FIG. 17 illustrates a separate motor 94 for each downwardly extending rod or bar 82, in other embodiments it is contemplated to employ a single motor that drives rotation of all lower ends via a suitable drive train (e.g., geared rotating shafts or the like). It is also noted that since the lifting tool 80 is not disposed inside the pressure vessel except when the reactor is shut down, the lifting tool 80 (including the motors 94) does not need to be rated for operation at the operating temperature of the nuclear reactor. The motors 94 should be robust against immersion in the primary coolant and in the fluid of the spent fuel pool 42 (see FIG. 3), for example by being hermetically sealed.

While various embodiments of rotational locks (e.g., bayonet or J-lock couplings) are disclosed herein, other types of locks, including non-rotational locks, are also contemplated. For example, in another contemplated embodiment the locks may employ motorized clamps that clamp onto respective mating features at the top of the fuel assembly.

With returning reference to FIG. 10, in an operation S6 the fuel assembly 10 connected with the lifting tool 80 is moved into the spent fuel pool 42 using the crane 44. In an operation S7 the lifting tool 80 is released from the top of the fuel assembly. The release operation S7 includes unlocking the lower ends $82_L$ of the downwardly extending elements 82 from the respective peripherally located mating features (e.g. lifting pins 26) at the top and periphery of the fuel assembly 10. In the illustrative embodiment, this entails rotating the lower ends $82_L$ in the opposite direction to that used in the locking operation and then lifting the unlocked lifting tool 80 upward away from the spent fuel assembly now residing in the spent fuel pool 42. Other unlocking operations may be employed depending upon the nature and configuration of the locking coupling.

Since the reactor core typically includes a number of fuel assemblies 10 (see the example of FIG. 2 in which the reactor core 30 includes sixty-nine fuel assemblies). Accordingly, after the release operation S7, an operation S8 is performed in which the next fuel assembly to be unloaded is selected, and the process repeats beginning at operation S4. Once all fuel assemblies have been unloaded, an operation S9 is performed in which the lifting tool 80 is parked in a storage location. Alternatively, if new fuel is to be loaded into the reactor, operations analogous to operations S4, S5, S6, S7, S8 are performed to pick up new fuel assemblies from a loading dock or other source location and place the new fuel assemblies into the core former 32, followed by performing control rod reattachment (analogous to operation S3), replacement of the upper vessel portion 52 (analogous to operation S2), and restarting the reactor (analogous to operation S1, and optionally further including performing various integrity or safety checks prior to the restart). Note that these analogous loading operations are not shown in FIG. 10. Additionally, the reloading may include performing other maintenance such as replacing the connecting rods or other internal reactor components, various inspection and/or cleanup operations, or so forth.

An advantage of the lifting tool 80 is that it accommodates a CRA inserted into the fuel assembly 10 that extends substantially above the top of the fuel assembly 10. Because no swing action is required to engage the lifting mechanism; the fuel assembly can be lifted even when most or all of the inboard volume above the fuel assembly is occupied by the upper portion 74 of the inserted CRA. The peripherally arranged downwardly extending elements 80 accommodate the exposed portion of the CRA by surrounding the exposed upper end of the inserted CRA (e.g., the upper support element 74) when the fuel assembly 10 is connected with the lifting tool. The downwardly extending elements 82 surround an open central region disposed below the upper end 81 of the lifting tool 80, such that the open central region can accommodate the upward extension of the inserted CRA out of the top of the fuel assembly 10. In this way, the CRA vertically overlaps the lifting tool 80 when the fuel assembly 10 is connected with the lifting tool 80 (see FIG. 13). In some embodiments the overlap is at least one-half of the vertical height of the lifting tool 80. In some embodiments the overlap between the CRA and the lifting tool 80 is at least one-half of the vertical height of the downwardly extending elements 82 of the lifting tool 80.

Figure 18:
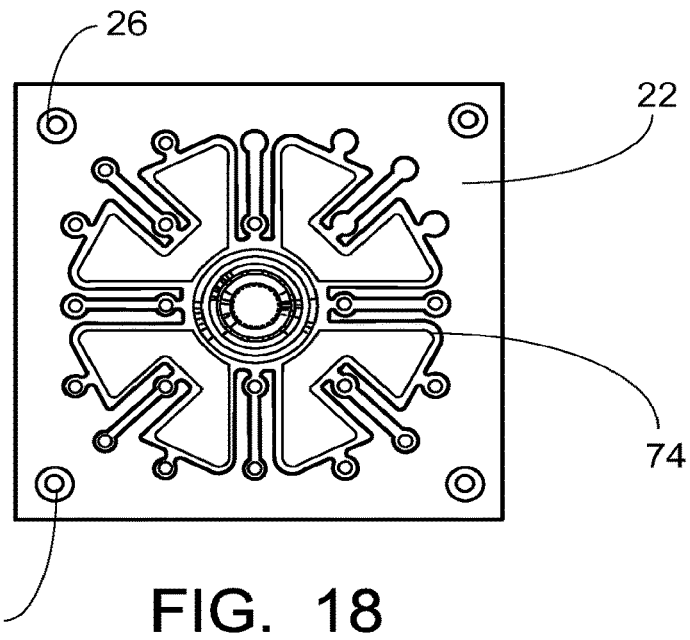
FIGS. 18-20 diagrammatically show overhead views of three nuclear fuel assembly embodiments each with an inserted control rod assembly (CRA) and showing the peripherally located mating features at the top of the fuel assembly for connecting with the lifting tool.
Figure 19:
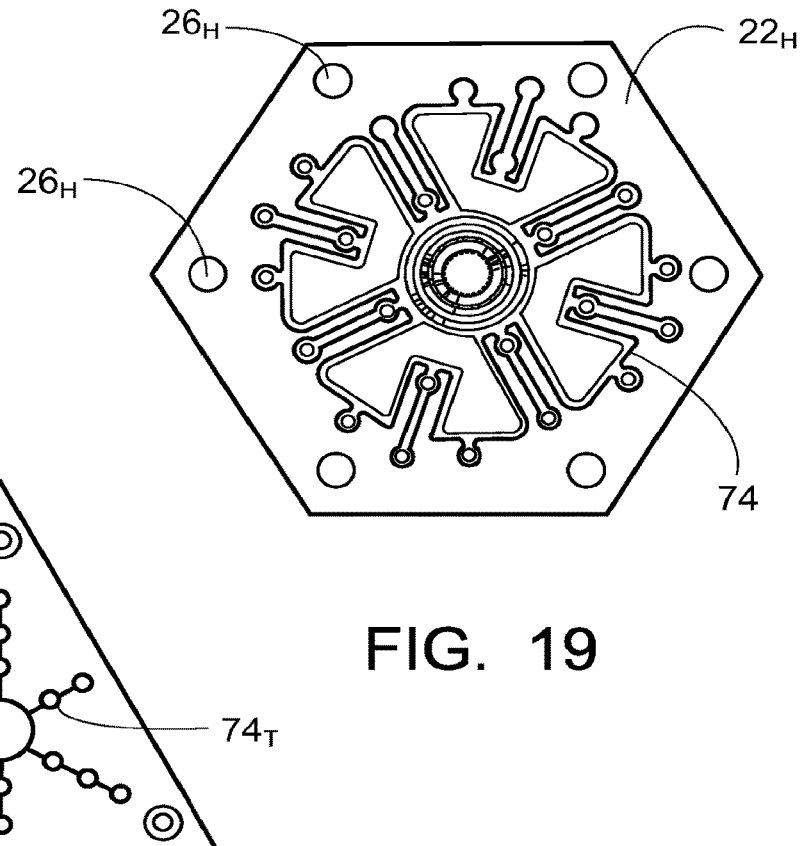
Figure 20:
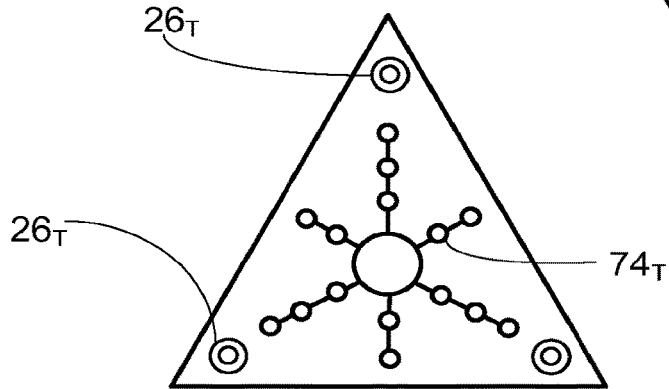

With reference to FIGS. 18-20, it is to be appreciated that the fuel assemblies, CRA, and lifting tool can have various geometries. FIG. 18 shows the illustrative geometry of the fuel assembly 10, which has a rectangular cross-section when viewed from above as per FIG. 18, with the CRA including the upper support element 74 inserted in illustrative FIG. 18. FIG. 19 illustrates a hexagonal fuel assembly $22_H$ having six sides, with the same CRA including the same upper support element 74 inserted. In this embodiment there are six mating features $26_H$ located at a top and periphery of the fuel assembly. The illustrative six mating features $26_H$ are the same as the lifting pins 26 of the fuel assembly 10. The corresponding lifting tool (not shown) suitably includes six downwardly extending elements, e.g. six downwardly extending rods or bars, arranged in a hexagonal pattern to mate with the respective six lifting pins $26_H$. Finally, as a further example, FIG. 20 illustrates a triangular fuel assembly $22_T$ having three sides, with a conventional spider $74_T$ with six branches serving as the upper support element of the CRA. In this embodiment there are three mating features $26_T$, which in this embodiment are embodied as recesses or openings $26_T$. The corresponding lifting tool (not shown) suitably includes three downwardly extending elements, e.g. three downwardly extending rods or bars, arranged in an equilateral triangular pattern to mate with the respective three openings $26_T$. In general, the geometry of the fuel assembly preferably promotes a closely packed arrangement.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of refueling a fuel assembly from a reactor core of a nuclear reactor, the method comprising:

connecting a lifting tool of a crane with a plurality of lifting pins of the fuel assembly, each lifting pin being non-rotatably affixed to an upper nozzle plate of the fuel assembly and extending upwardly therefrom, the lifting tool comprising a plurality of downwardly extending bars, wherein each of the downwardly extending bars has an upper portion and a lower portion capable of circumferential rotation independent of both the upper portions and the other downwardly extending bars, the connecting including forming a bayonet connection by lowering the downwardly extending bars over the lifting pins so that the lifting pins are disposed within the lower portions of the downwardly extending bars and circumferentially rotating only the lower portion of each of the downwardly extending bars to create a mating connection between each of the downwardly extending bars and the lifting pin over which each of the downwardly extending bars was lowered, wherein the mating connection is made between a grooved portion and a narrowed portion of the lifting pin and a recess portion and a narrowed region of the lower end of the downwardly extending bars.

2. The method of claim 1, including moving the fuel assembly connected with the lifting tool into a spent fuel pool using the crane.

3. The method of claim 1, including releasing the lifting tool from the top of the fuel assembly, the releasing including circumferentially rotating the lower portion of each of the downwardly extending bars to release the bayonet connection.

4. The method of claim 1, wherein the removal method includes simultaneously removing both the fuel assembly and a control rod assembly that is inserted in the fuel assembly, and wherein the control rod assembly vertically overlaps the lifting tool when the fuel assembly is connected with the lifting tool.

5. The method of claim 4, wherein the overlap between the control rod assembly and the lifting tool is at least one-half of the vertical height of the lifting tool.

6. The method of claim 4, wherein the overlap between the control rod assembly and the lifting tool is at least one-half of the vertical height of the downwardly extending bars of the lifting tool.

7. The method of claim 6, wherein each of the downwardly extending bars comprises a motor and the motor provides operative force to circumferentially rotate the lower portion of each of the downwardly extending bars.

8. The method of claim 1, wherein the removal method does not include removing the control rod assembly from the fuel assembly and wherein the lower portions of the downwardly extending bars of the lifting tool surround an upper end of the inserted control rod assembly when the fuel assembly is connected with the lifting tool.

9. A method of removing a fuel assembly from a reactor core of a nuclear reactor, the method comprising:
lowering a lifting tool of a crane onto a plurality of lifting pins of the fuel assembly, each lifting pin being non-rotatably affixed to an upper nozzle plate of the fuel assembly and extending upwardly therefrom, the lowered lifting tool including a plurality of downwardly extending bars each including an upper portion and a circumferentially rotatable lower portion having a recess and a narrowed portion, each lifting pin being disposed in a recess of a corresponding downwardly extending bar after the lifting tool is lowered onto the lifting pins;
locking the downwardly extending bars of the lowered lifting tool with corresponding mating features of the lifting pins by circumferentially rotating the lower portion of each downwardly extending bar to create a bayonet connection, wherein
the mating connection is made between a grooved portion and a narrowed portion of the lifting pin and the recess and the narrowed portion of the lower end of the downwardly extending bars.

10. The method of claim 9, including moving the fuel assembly connected with the lifting tool into a spent fuel pool using the crane.

11. The method of claim 9, including disconnecting the lifting tool from the lifting pins of the fuel assembly by circumferentially rotating the lower portion of the downwardly extending bars and unlocking the downwardly extending bars from the corresponding mating features of the lifting pins.

12. The method of claim 11, wherein the lifting tool is disconnected from the fuel assembly in the spent fuel pool.

* * * * *